United States Patent
Moustirats (10) Patent No.: US 8,418,396 B2
(45) Date of Patent: Apr. 16, 2013

(54) HUMANE ANIMAL TRAP

(76) Inventor: Frank Moustirats, Arroyo Grande, CA (US)

( * ) Notice: Subject to any disclaimer, the term of this patent is extended or adjusted under 35 U.S.C. 154(b) by 539 days.

(21) Appl. No.: 12/635,564

(22) Filed: Dec. 10, 2009

(65) Prior Publication Data
US 2011/0138676 A1   Jun. 16, 2011

(51) Int. Cl.
*A01M 23/20* (2006.01)
*A01M 23/16* (2006.01)
*A01M 23/00* (2006.01)

(52) U.S. Cl.
USPC ................................. 43/61; 43/58

(58) Field of Classification Search ............... 43/58, 60, 43/61
See application file for complete search history.

(56) References Cited

U.S. PATENT DOCUMENTS

| | | | | |
|---|---|---|---|---|
| 123,807 A * | 2/1872 | Bowman | | 43/61 |
| 253,907 A * | 2/1882 | Andre | | 43/61 |
| 879,010 A * | 2/1908 | Schmitt | | 43/79 |
| 1,052,320 A * | 2/1913 | Crain | | 43/61 |
| 1,139,849 A * | 5/1915 | Collins | | 43/61 |
| 1,218,514 A * | 3/1917 | Blakeslee | | 43/61 |
| 1,290,697 A * | 1/1919 | Banash | | 43/81 |
| 1,347,255 A * | 7/1920 | Davenport | | 43/84 |
| 1,382,416 A * | 6/1921 | Dresser | | 43/61 |
| 1,650,455 A * | 11/1927 | Lewis | | 43/61 |
| 2,059,954 A * | 11/1936 | McDonald | | 43/61 |
| 2,129,594 A * | 9/1938 | Shimamoto | | 43/61 |
| 2,257,246 A * | 9/1941 | Rudolph | | 43/81 |
| 2,284,867 A * | 6/1942 | Harris | | 43/61 |
| 2,412,518 A * | 12/1946 | Krelwitz | | 43/61 |
| 2,446,168 A * | 8/1948 | Bricker | | 43/61 |
| 2,488,202 A * | 11/1949 | Kern | | 43/61 |
| 2,544,026 A * | 3/1951 | Kern et al. | | 43/61 |
| 2,554,728 A * | 5/1951 | Barber | | 43/96 |
| 2,573,228 A * | 10/1951 | Slauth | | 43/61 |
| 2,589,002 A * | 3/1952 | Vonada | | 43/61 |
| 2,608,018 A * | 8/1952 | Tyler | | 43/61 |
| 2,638,700 A * | 5/1953 | Nantt | | 43/80 |
| 3,426,470 A * | 2/1969 | Rudolph | | 43/61 |
| 3,585,750 A | 6/1971 | Routt | | |
| 3,729,852 A * | 5/1973 | Holmes | | 43/61 |

(Continued)

FOREIGN PATENT DOCUMENTS
DE   102007037275 A1 *  2/2009
FR        2819989 A1 *  8/2002

(Continued)

*Primary Examiner* — Darren W Ark
(74) *Attorney, Agent, or Firm* — SoCal IP Law Group LLP; Mark A. Goldstein; Steven C. Sereboff (57) ABSTRACT

An animal trap comprised of an elongated conduit, the elongated conduit including an open proximal end, a closed distal end, inner and outer walls, and a slot dimensioned to receive a door therethrough. The door when urged into the slot is dimensioned to substantially encompass a cross sectional area of the elongated conduit. A tension member is coupled to the door for urging the door into the slot independent of gravity or geometric alignment of the animal trap when released by an actuator. The actuator is coupled to the door. A sensor is provided for signaling a presence of an animal within an interior volume of the elongated conduit. A trigger circuit is operatively coupled with the sensor and the actuator and is configured to cause the actuator to release the door upon receipt of a presence of an animal signal from the sensor.

15 Claims, 6 Drawing Sheets

U.S. PATENT DOCUMENTS

| | | | |
|---|---|---|---|
| 3,815,278 A * | 6/1974 | Beaton et al. | 43/99 |
| 3,992,803 A * | 11/1976 | Kaiser | 43/83 |
| 4,138,796 A | 2/1979 | Souza | |
| 4,159,590 A * | 7/1979 | Palfalvy | 43/61 |
| 4,187,634 A * | 2/1980 | Kintz | 43/61 |
| 4,216,606 A * | 8/1980 | Kaiser et al. | 43/83 |
| 4,393,616 A * | 7/1983 | Kaufman et al. | 43/60 |
| 4,393,617 A * | 7/1983 | Charnoske | 43/96 |
| 4,554,758 A * | 11/1985 | Molloy | 43/61 |
| 4,567,688 A * | 2/1986 | McKee | 43/61 |
| 4,835,900 A | 6/1989 | Shifflett | |
| 4,899,484 A * | 2/1990 | Morin | 43/61 |
| 4,926,581 A * | 5/1990 | Grivas | 43/61 |
| 4,979,327 A * | 12/1990 | Harris | 43/61 |
| 5,107,619 A * | 4/1992 | Zapata et al. | 43/58 |
| 5,148,624 A * | 9/1992 | Schmidt | 43/81 |
| 5,154,017 A * | 10/1992 | Disalvo | 43/81 |
| 5,172,512 A * | 12/1992 | Bodker et al. | 43/81 |
| 5,184,416 A * | 2/1993 | Brewer | 43/81 |
| 5,185,953 A * | 2/1993 | Gross | 43/58 |
| 5,199,210 A * | 4/1993 | Nastas | 43/61 |
| 5,267,411 A * | 12/1993 | Phillips et al. | 43/61 |
| 5,477,635 A * | 12/1995 | Orsano | 43/81 |
| 5,615,514 A * | 4/1997 | Meade, Jr. | 43/61 |
| 5,778,594 A * | 7/1998 | Askins et al. | 43/61 |
| 5,867,934 A * | 2/1999 | Conover | 43/61 |
| 5,918,409 A | 7/1999 | Carnwath | |
| 5,953,853 A | 9/1999 | Kim | |
| 6,003,265 A * | 12/1999 | Lundgren | 43/61 |
| 6,016,623 A | 1/2000 | Celestine | |
| 6,137,415 A * | 10/2000 | Rast | 43/81 |
| 6,178,686 B1 * | 1/2001 | Batman | 43/61 |
| 6,202,340 B1 * | 3/2001 | Nieves | 43/61 |
| 6,445,301 B1 * | 9/2002 | Farrell et al. | 43/61 |
| 6,484,436 B1 * | 11/2002 | Chang | 43/61 |
| 6,484,672 B1 | 11/2002 | Versaw | |
| 6,609,327 B2 * | 8/2003 | Stoico et al. | 43/61 |
| 6,618,982 B2 * | 9/2003 | Lafforthun | 43/61 |
| 6,684,560 B2 | 2/2004 | Lafforthun | |
| 6,775,946 B2 * | 8/2004 | Wright | 43/61 |
| 6,807,767 B1 * | 10/2004 | Schade | 43/77 |
| 7,051,472 B1 * | 5/2006 | Kelly | 43/61 |
| 7,088,251 B2 | 8/2006 | Weilbacher, Jr. | |
| 7,509,770 B2 * | 3/2009 | Gardner et al. | 43/58 |
| 7,540,109 B2 * | 6/2009 | Hall | 43/61 |
| 7,930,853 B2 * | 4/2011 | Pomerantz | 43/61 |
| 7,980,023 B2 * | 7/2011 | Nelson et al. | 43/58 |
| 8,112,934 B2 * | 2/2012 | Alter et al. | 43/61 |
| 8,171,667 B2 * | 5/2012 | Facklam | 43/61 |
| 2002/0184811 A1 | 12/2002 | Wright | |
| 2003/0110679 A1 * | 6/2003 | Collins | 43/81 |
| 2003/0213161 A1 | 11/2003 | Gardner, Jr. et al. | |
| 2004/0020100 A1 * | 2/2004 | O'Brien et al. | 43/1 |
| 2004/0025410 A1 * | 2/2004 | Shapland | 43/65 |
| 2005/0097808 A1 * | 5/2005 | Vorhies et al. | 43/61 |
| 2009/0193707 A1 * | 8/2009 | Moran et al. | 43/58 |
| 2010/0321188 A1 * | 12/2010 | Klute | 43/60 |
| 2011/0072709 A1 * | 3/2011 | Patterson et al. | 43/58 |
| 2011/0126777 A1 * | 6/2011 | Dunigan | 43/61 |
| 2011/0167709 A1 * | 7/2011 | Pinkston | 43/61 |
| 2012/0117853 A1 * | 5/2012 | Studer et al. | 43/61 |
| 2012/0180378 A1 * | 7/2012 | Studer et al. | 43/60 |

FOREIGN PATENT DOCUMENTS

| | | | |
|---|---|---|---|
| GB | 2258381 A * | 2/1993 | |
| JP | 08056549 A * | 3/1996 | |
| JP | 10215752 A * | 8/1998 | |
| JP | 2001128610 A * | 5/2001 | |
| JP | 2001275545 A * | 10/2001 | |
| JP | 2002272352 A * | 9/2002 | |
| JP | 2002335845 A * | 11/2002 | |
| JP | 2003144035 A * | 5/2003 | |
| JP | 2003169587 A * | 6/2003 | |
| JP | 2003225044 A * | 8/2003 | |
| JP | 2003310134 A * | 11/2003 | |
| JP | 2004097019 A * | 4/2004 | |
| JP | 2004121077 A * | 4/2004 | |
| JP | 2004305050 A * | 11/2004 | |
| JP | 2004321039 A * | 11/2004 | |
| JP | 2005210966 A * | 8/2005 | |
| JP | 2005211033 A * | 8/2005 | |
| JP | 2006340627 A * | 12/2006 | |
| JP | 2007167024 A * | 7/2007 | |
| JP | 2009100696 A * | 5/2009 | |
| JP | 2011024446 * | 2/2011 | |
| JP | 2012039928 A * | 3/2012 | |
| JP | 2012055210 A * | 3/2012 | |

* cited by examiner

HUMANE ANIMAL TRAP

CROSS-REFERENCE TO RELATED APPLICATIONS

Not applicable

RELEVANT FIELD

This application is directed generally toward animal traps and more specifically toward humane animal traps.

BACKGROUND

Animal traps are generally configured to capture an animal live or to sacrifice the animal depending on the particular design of the trap. Lethal trap designs typically employ a spring-loaded element which crushes the animal between opposing surfaces. Non-lethal traps typically employ gravity drawn doors which are released when an animal trips a release mechanism. In both cases, the geometry of the animal traps require that the animal traps be generally level with the ground or structure in which the trap is deployed. These traps typically require some type of bait or other attractant to lure the animal into the trap.

However, in many cases, traps known in the relevant art are not effective due to a variety of factors. For example, many animals will avoid traps simply because of a human scent being present. In other instances, the animals are primarily burrowing and spend little time above ground leaving little opportunity for humane live capture. In these instances, lethal traps and/or poisons may be required which may be undesirable. For example, the use of lethal traps requires frequent monitoring to remove the trapped animals. Otherwise, the decaying corpse of the dead animal may result in strong offensive odors, attract scavenger animals, and/or reduce the effectiveness of other animal traps in the vicinity due to association of the trap with the scent of the dead animal. In other situations, poisons may be unsuitable for the above reasons and in addition, pose a threat to non-targeted wildlife, domestic animals, children and possible environmental contamination. Accordingly, there is a need in the relevant art for a humane animal trap which avoids one or more of the undesirable properties of animals traps known in the relevant art.

SUMMARY

In view of the foregoing, various exemplary embodiments of a humane animal trap are disclosed which avoids the use of baits or other attractants, does not rely on gravity or geometry for trap operation and may be simply and safely operated by a consumer. The geometry independence allows the animal trap to be situated at angles which approximate an angle of a burrow dug by a burrowing animal. Examples of some burrowing animals suitable for capture with the animal trap include but are not limited to; rabbits, gophers, badgers, prairie dogs, groundhogs, moles, chipmunks, skunks, and ground squirrels. For purposes of this specification, a burrow is defined as a hole or tunnel in the ground made by a burrowing animal for habitation and refuge. Where necessary, the animal trap described herein may be dimensionally scaled to accommodate animals of various sizes whether burrowing or otherwise. The animal trap may also be used to safely transport a captured animal to a wilderness or other habitat for release without undue trauma or stress to the captured animal.

In an exemplary embodiment, the humane animal trap is comprised of an elongated conduit having an open end, a closed end, an inner wall, an outer wall, and a through wall slot in the elongated conduit dimensioned to receive a door. The slot is transversely aligned with the longitudinal axis of the elongated conduit. The door is dimensioned to substantially encompass a cross-sectional area of the interior of the elongated conduit when drawn into the slot. A tension member is coupled to the door and configured to urge the door into the slot independent of gravity or geometric alignment of the animal trap. An actuator mechanically latches the door in an armed position in longitudinal alignment with the slot using the bias force provided by the tension member to maintain the door in the armed position. In an embodiment, the armed position longitudinally disposes a bottom edge of the door into the slot between the inner and outers walls of the elongated conduit. An electronic sensor is disposed in a through wall aperture proximate to the closed end of the elongated conduit and provides signals indicative of a presence of an animal within an interior volume of the animal trap.

A trigger circuit is operatively coupled with the electronic sensor and the actuator. The trigger circuit is configured to cause the actuator to release the door upon receipt of the presence of an animal signal from the sensor. Upon release of the door by the actuator, the tension element pulls the door into the slot thereby trapping the animal between the closed end of the elongated contained and the door. In an exemplary embodiment, the trigger circuit comprises a detection circuit for determining the presence of an animal within the interior volume of the elongated conduit, a capacitive storage unit for providing electrical energy to the actuator when triggered by the detection circuit. In various embodiments, a wireless alert circuit may coupled to the detector circuit to provide for remote signaling of an alarm unit when the animal trap has been tripped and/or a solar cell may be coupled to at least the capacitive storage unit for maintaining an electrical charge separate from a storage battery.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments as is defined by the claims.

DETAILED DESCRIPTION

Various exemplary embodiments of a humane animal trap are disclosed herein. In the following exemplary description, numerous specific details are set forth in order to provide a thorough understanding of the present inventive embodiments. It will be apparent, however, to one skilled in the art that the present inventive embodiments may be practiced without these specific details. In other instances, well-known structures, devices or components may be shown in block diagram form in order to avoid unnecessarily obscuring the present inventive embodiments.

Figure 1:
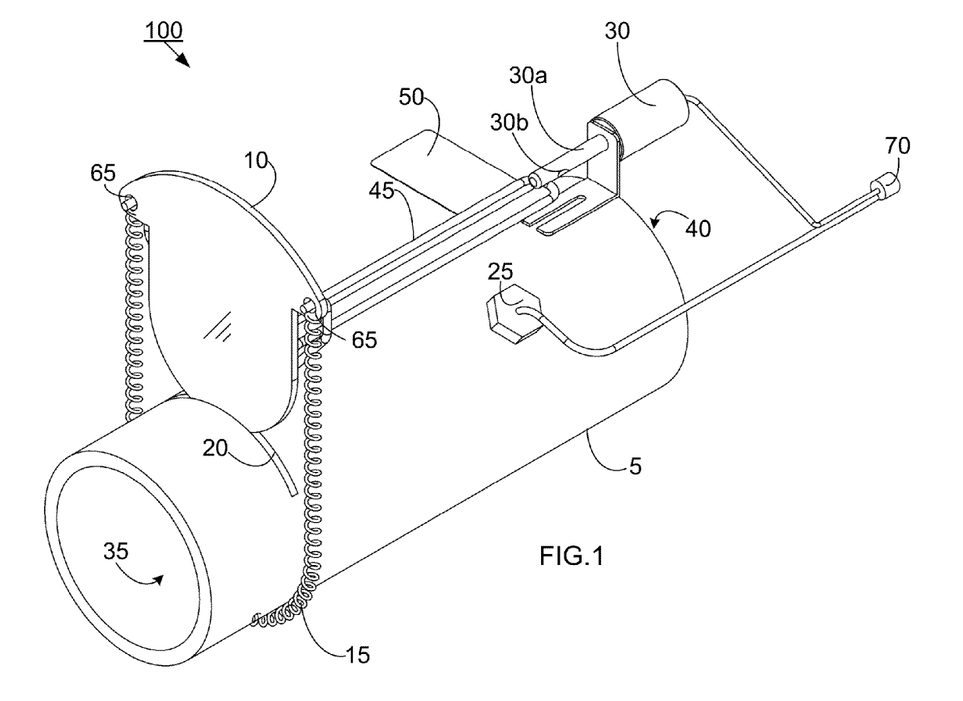
FIG. 1—depicts a perspective view of an animal trap in accordance with an exemplary embodiment.

Referring to FIG. 1, a perspective view of an animal trap 100 in accordance with an exemplary embodiment is depicted. In this exemplary embodiment, the animal trap 100 is formed from an elongated conduit 5, by way of example and not limitation, polyvinyl chloride (PVC) pipe. A distal closed end 40 of the elongated conduit 5 is closed, typically with an end cap or plug. The proximate end 35 of the elongated conduit 5 is open to allow entry of animal into an interior volume 60 (FIG. 2) of the animal trap 100. A slot 20 is provided intermediate the proximal 35 and distal ends 40 of the elongated conduit 5. The slot 20 is axially aligned with a long dimension of the elongated conduit 5 and configured to transversely receive a door 10 therethrough. In an embodiment, the slot 20 includes an arcuate profile which corresponds to an outer circumferential profile of the elongated conduit 5. The axial length of the slot 20 approximates the cross sectional diameter of an inner wall 5b (FIGS. 3A & 3B) of the elongated conduit 5.

Figure 5:
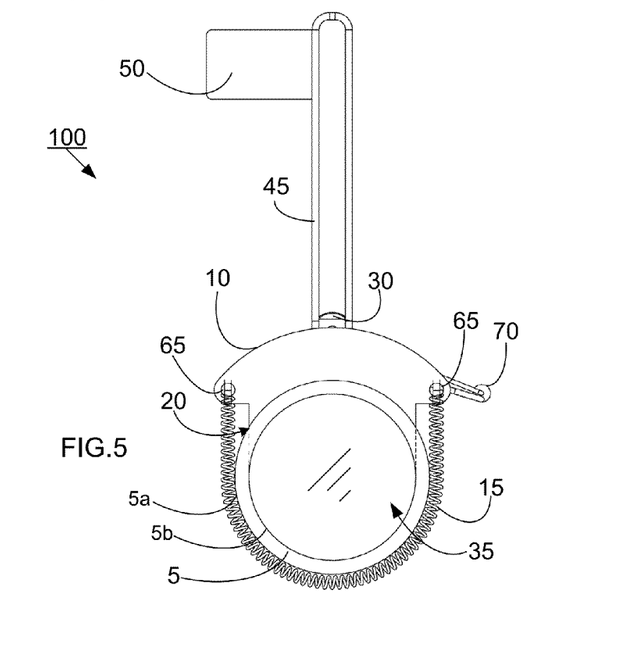
FIG. 5—depicts another front view of an animal trap in accordance with an exemplary embodiment.

The slot 20 is axially dimensioned so that the door 10, when inserted into the slot 20 provides a barrier to escape of an animal encompassed in an interior volume 60 (FIG. 2) defined by the door 10 and the distal closed end 40 of the elongated conduit 5. When inserted into the slot 20, the door 10 substantially encompasses a cross-sectional area of the inner wall 5b of the elongated conduit 5 in a plane perpendicular to a long dimension of the elongated conduit 5 (FIG. 5). The door 10 is typically constructed from a planar material having a thickness in a range of about 0.03-0.13 inches. The actual construction material of the door is not critical. However, consideration should be given to the type of animal intended to be captured by the animal trap 100. Many animals have sharp claws and/or teeth which could be used to claw and/or chew through the door 10 if inadequate construction materials are used.

The door 10 may have a disk or elongated shape which when inserted into the slot 20 provides insufficient clearance for the animal caught within the interior volume 60 from squeezing around the sides or bottom of the door 10 and escape. In an embodiment, the door 10 may be constructed with rods to form a cage type door (not shown).

In an embodiment, a tension member 15 is coupled to the door 10 which urges the door 10 into the slot 20 independent of gravity or geometric alignment of the animal trap 100. The tension member 15 may be formed from a helically wound metal spring or elastomeric material. In an embodiment, the tension member 15 exerts a bias force which pulls the door 10 into the slot 20 with sufficient residual tension to maintain the door 10 against the inner wall 5b of the elongated conduit 5 opposite the slot 20. In an embodiment, the tension member 15 includes a hemispherical shape which conforms to an outer circumferential profile of the elongated conduit 5 at least opposite the slot 20. The tension member 15 is coupled to the door 10 at opposing coplanar lateral edges proximate to a top edge of the door 10. The tension member 15 may be attached to the door 10 by way of clips, hooks, fasteners, wires or directly threaded through coplanar apertures 65 drilled through a face on opposing sides of the door 10. The actual mechanism used to attach the tension member 15 to the door 10 is not critical. The goal is to provide a uniform inward directed bias force which pulls the door 10 into the slot 20 with sufficient remaining tension to maintain the door 10 against the inner wall 5b of the elongated conduit 5 opposite the slot 20.

An actuator 30, typically a solenoid, is coupled to the exterior of the elongated conduit 5. The actuator 30 may be removably coupled to the elongated conduit 5 using common fasteners or clamps (not shown). In an embodiment, the actuator 30 includes a retractable rod 30a which is longitudinally pulled into a main body of the actuator 30 when electrical power is supplied to the actuator 30. The actuator 30 is longitudinally aligned with the elongated conduit 5 such that when the actuator 30 is energized, the retractable rod 30a is longitudinally pulled toward the distal end 40 of the elongated conduit 5. To simplify placing the animal trap 100 in an armed position, the retractable rod 30a may be provided with a notch 30b or other retentive profile to prevent tripping of the animal trap 100 during handling or setup. One skilled in the art will appreciate that other arrangements such as annular rings, lips or separate retention devices may be used to permit simple setup of the animal trap 100 before being set in the armed position.

In an embodiment, a linkage 45 is provided which couples the actuator 30 with the door 10. When the animal trap 100 is set (armed), the linkage 45 is predominately longitudinally aligned with the elongated contained 5. A flag 50 may be attached to a portion of the linkage 45 to allow visual indication that the animal trap 100 has been tripped. A more detailed discussion of the linkage 45 is provided in the discussion accompanying FIG. 2 below. A sensor 25 is provided which monitors the interior volume 60 of the elongated conduit 5 for the presence of animal. The sensor 25 may include a shroud to adjust the sensor's field of view. With exception of the sensor 25 which may protrude slightly into the interior volume 60 of the elongated conduit 5, the interior volume 60 of the elongated conduit 5 is substantially devoid of mechanical components which could alert an animal that it has entered into animal trap.

The sensor 25 is disposed in a through wall aperture disposed intermediate the slot 20 and the distal end 40 of the elongated conduit 5. The sensor 25 may be maintained within the through wall aperture using a elastomeric grommet which allows for simple removal and insertion. In an embodiment, the sensor 25 is an infrared motion sensor which detects the infrared heat signature radiated by warm blooded animals which enter the interior volume 60 of the animal trap.

Figure 8:
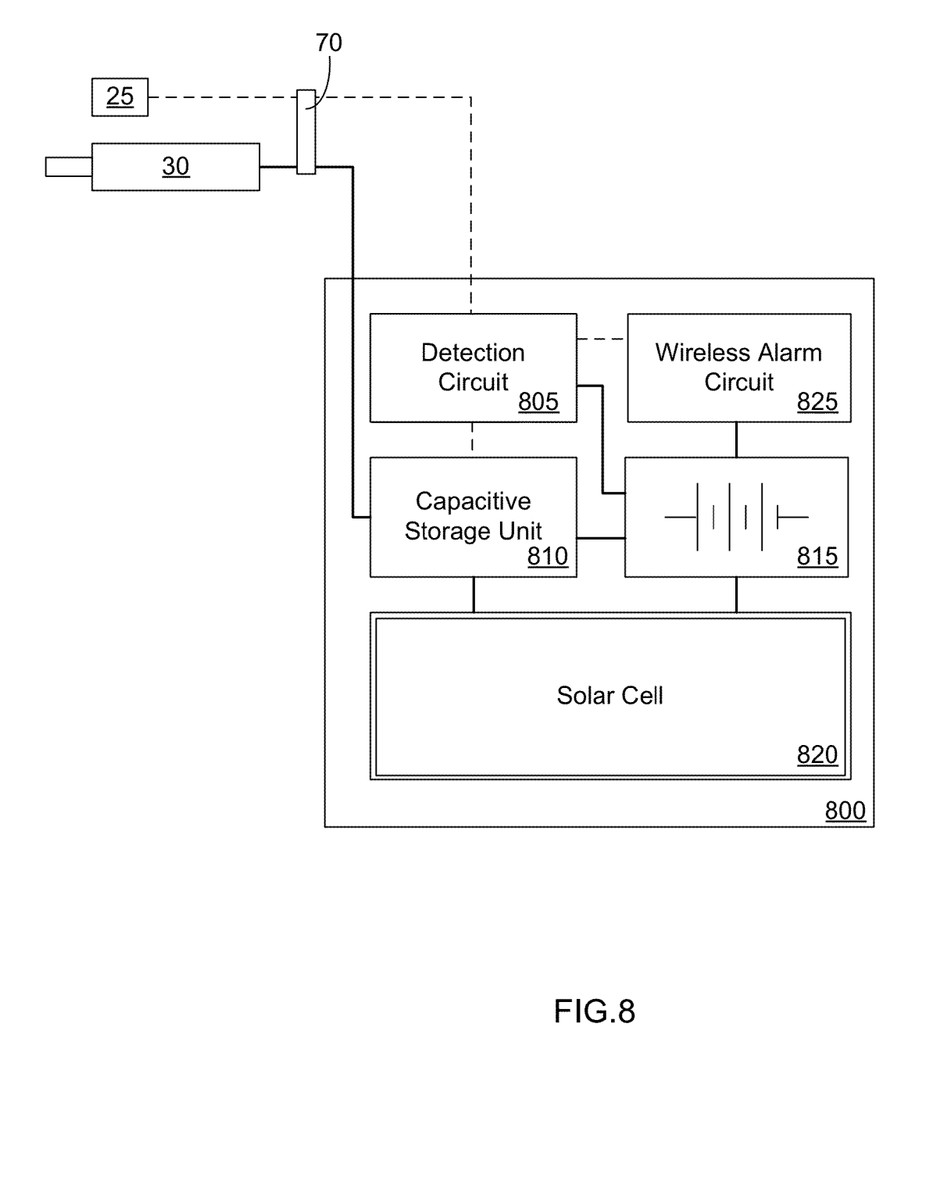
FIG. 8—depicts a block diagram of a trigger circuit in accordance with an exemplary embodiment.

Alternately, the sensor 25 may be changed to an ultrasonic, acoustic, magnetic field, accelerometer, optoelectric or any other type sensor which does not discriminate between warm-blooded and cold blooded animals. The sensor 25 may generate either digital or analog signals. For capture of warm-blooded animals, the infrared motion sensor 25 is preferred due to its low costs and general availability of components. For example, infrared motion sensors are widely used in motion detection lighting fixtures. The sensor 25 and actuator 30 are electrically coupled 70 to a trigger circuit 800 (FIG. 8). The trigger circuit 800 is described in the discussion accompanying FIG. 8 below.

Figure 2:
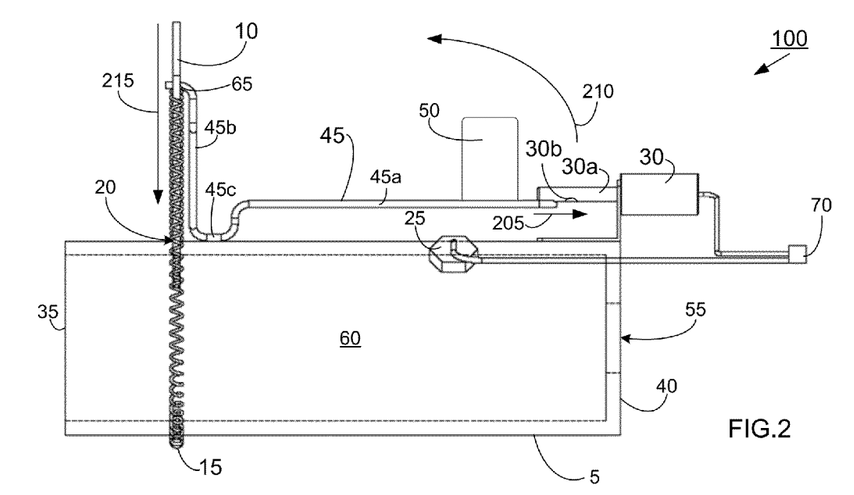
FIG. 2—depicts a side view of an animal trap in accordance with an exemplary embodiment.

Referring to FIG. 2, a side view of an animal trap 100 in accordance with an exemplary embodiment is depicted. In this embodiment, the linkage 45 is shown as having a generally "L" shaped configuration in which a long leg 45a is longitudinally aligned with the elongated conduit 5 in an armed position. The long leg 45a of the linkage 45 is longitudinally dimensioned to span a distance slightly greater than a distance between the retractable rod 30a of the actuator 30 and the door 10. One end of the long leg 45a of the linkage 45 is restively retained or latched by the retractable rod 30a. An opposite end of the long leg 45a of the linkage 45 forms a pivot point 45c proximate to the door 10. In an embodiment, the pivot point 45c is configured as a "U" shaped bend in which the curved portion of the "U" contacts the outer wall 5a of the elongated conduit 5 proximate to the door 5. In the armed position, a short leg 45b of the "L" shaped linkage 45 is coupled to the pivot point 45c. The short leg 45b of the linkage 45 is perpendicularly aligned with the elongated conduit 5 and extends perpendicularly outward from the long axis of the elongated conduit 5 in a parallel spaced relationship with the door 10.

The short leg 45b of the linkage 45 is dimensioned to span a distance between the outer wall 5a of the elongated conduit 5 and one or more of the coplanar apertures 65 drilled through the planar face on opposing lateral sides of the door 10. The short leg 45b of the linkage 45 is configured to maintain the door 10 in a generally parallel alignment with the slot 20 when in the armed position. In an embodiment, the short leg 45b of the linkage 45 includes coplanar diverging sections configured to restively engage the coplanar apertures 65; the coplanar diverging sections forming a "V" shape extending from the pivot point 45c which joins the long leg 45a with the short leg 45b of the linkage 45. Ends of the short leg 45b of the linkage 45 proximate to the door 10 may include arcuate or hooked shapes which allow the ends of the short leg 45b of the linkage 45 to pass through the coplanar apertures 65 and pivotally retain the door 10 when in the armed position.

When the animal trap 100 is set in the armed position, the linkage 45 is restively retained or latched by the retractable rod 30a of the actuator 30. The linkage 45 may be constructed from any suitable generally rigid material, for example a steel rod. When an animal is detected by the sensor 25 within the internal volume 60 of the elongated conduit 5, the trigger circuit 800 (FIG. 8) energizes the actuator 30 which electromagnetically retracts 205 the retractable rod 30a toward the distal end of the elongated conduit 5. Withdrawal 205 of the retractable rod 30a releases 210 the linkage 45 from restive retention by the retractable rod 30a. The inward directed bias force 215 generated by the tension member 15 is communicated through the door 10 which pulls the short leg 45b of the linkage 45 toward the outer wall 5a of the elongated conduit 5 as the door 10 is drawn into the slot 20 by the bias force 215. Stated another way, the short leg 45b is repositioned from a position generally perpendicular with a long dimension of the elongated conduit 5 to a position generally parallel to the long dimension of the elongated conduit 5 as the linkage transitions from the armed position to the tripped position. The inward movement of the door 215 causes the linkage 45 to rotate about the pivot point 45c which raises the flag 50 from a position generally parallel with a long dimension of the elongated conduit 5 to a position generally perpendicular to the long dimension of the elongated conduit 5.

Figure 3A:
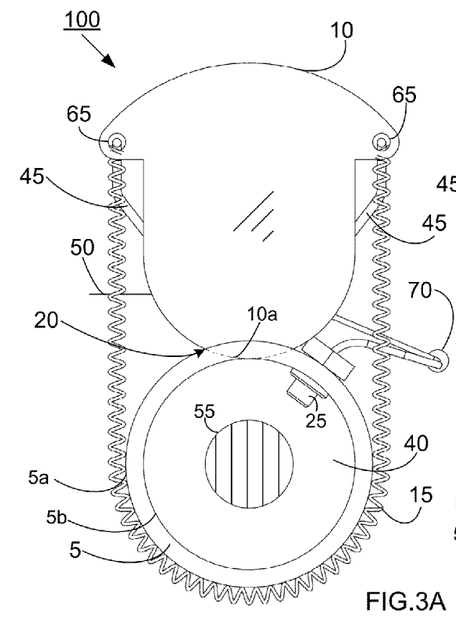
FIG. 3A—depicts a first front view of an animal trap in accordance with an exemplary embodiment.

Referring to FIG. 3A, a first front view of an animal trap 100 in accordance with an exemplary embodiment is depicted. In this embodiment, the animal trap 100 is depicted in the armed position with a bottom edge 10a of the door 10 partially inserted into the slot 20 such that the bottom edge 10a of the door 10 lies intermediate the inner 5b and outer walls 5a of the elongated conduit 5. In an embodiment, the closed end 40 of the elongated conduit 5 includes a window 55 which allows light to illuminate the interior volume 60 (FIG. 2) of the elongated conduit 5. The window 55 may be formed by slots cut into the closed end 40 of the elongated conduit 5, by a glass or Plexiglas insert, a mesh or screen, bars or any other suitable barrier materials known in the relevant art. The dimensions of the window 55 are not critical.

Figure 3B:
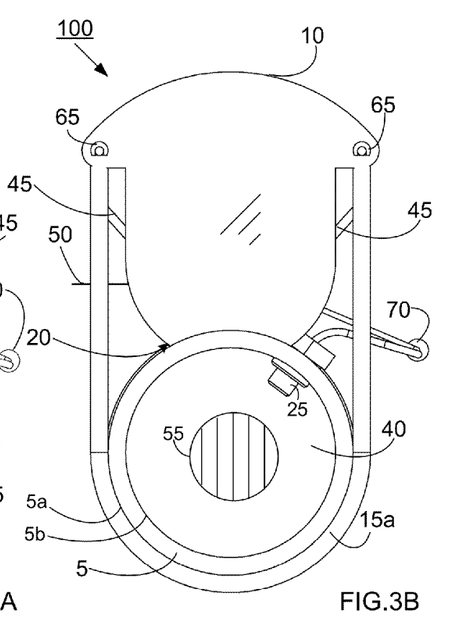
FIG. 3B—depicts a second front view of an animal trap in accordance with an exemplary embodiment.

However, the spacing of barriers should be small enough to prevent the animal from escaping. In FIG. 3B, a second front view of an animal trap 100 in accordance with an exemplary embodiment is depicted. In this alternate embodiment of the animal trap 100, an elastomeric tension member 15a is used in place of the helically wound spring type tension member 15. Examples of suitable elastomeric tension members 15a include but are not limited to bungee cords, surgical tubing, rubber bands, etc. The remaining aspects of this alternate embodiment are substantially similar to the embodiment described for FIG. 3A. In both exemplary embodiments, the tension member 15, 15a should provide sufficient bias force to pull the door 10 into the animal trap 100 via the slot 20 with sufficient residual tension to maintain the door 10 against the inner wall 5b of the elongated conduit 5 to prevent a trapped animal from prying open the door 10 and escaping.

Figure 4:
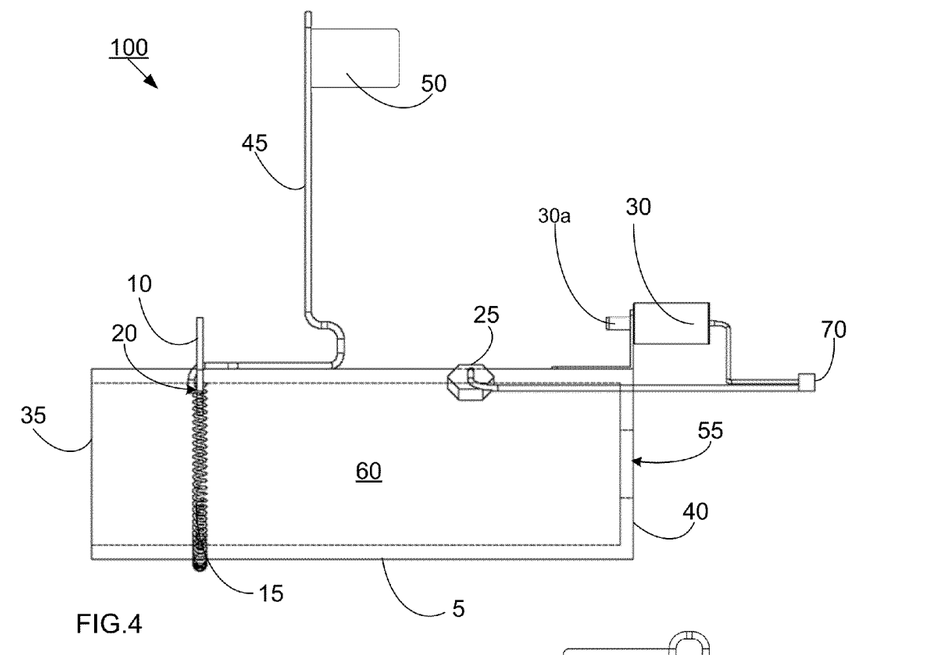
FIG. 4—depicts a side view of an animal trap in accordance with an exemplary embodiment.

Referring to FIG. 4, a side view of an animal trap 100 in accordance with an exemplary embodiment is depicted. In this embodiment, the animal trap 100 is shown in a tripped position in which the linkage 45 and attached flag 50 are substantially perpendicular to the long axis of the elongated conduit 5. In the tripped position, the door 10 is held against the interior wall 5b (FIG. 2) by the residual bias force generated by the tension member 15 discussed above. In this view, the orientation of the flag 50 has been changed for clarity only. The flag 50 may be attached at any angle convenient to the user.

Referring to FIG. 5, a front view of an animal trap 100 in accordance with an exemplary embodiment is depicted. In this embodiment, the animal trap 100 is depicted in the tripped position with the door 10 substantially encompassing the cross-sectional area of the inner wall 5b of the elongated conduit 5. The animal (not shown) which triggered the animal trap 100 is maintained in the interior volume 60 (FIG. 2) between the door 10 and distal closed end 40 (FIG. 4) of the elongated conduit 5.

Figure 6:
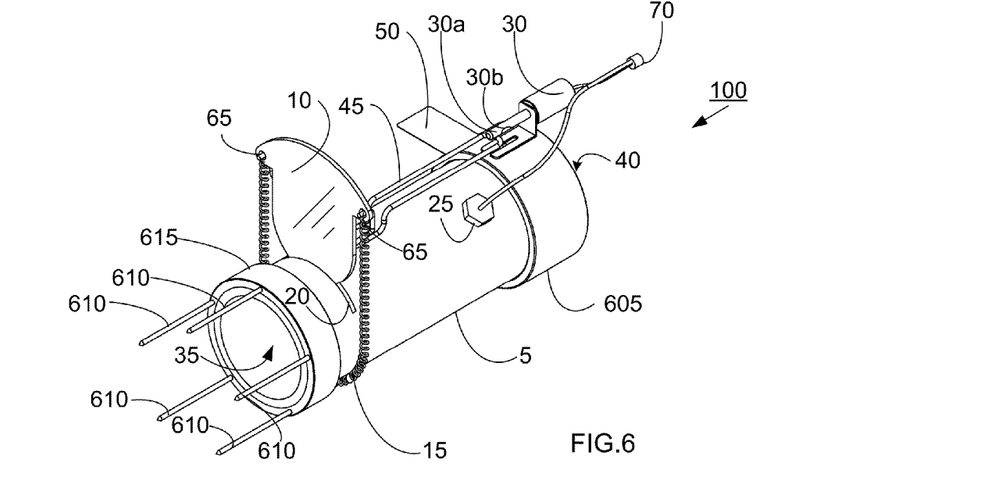
FIG. 6—depicts a perspective view of an animal trap in accordance with an exemplary embodiment.
Figure 7:
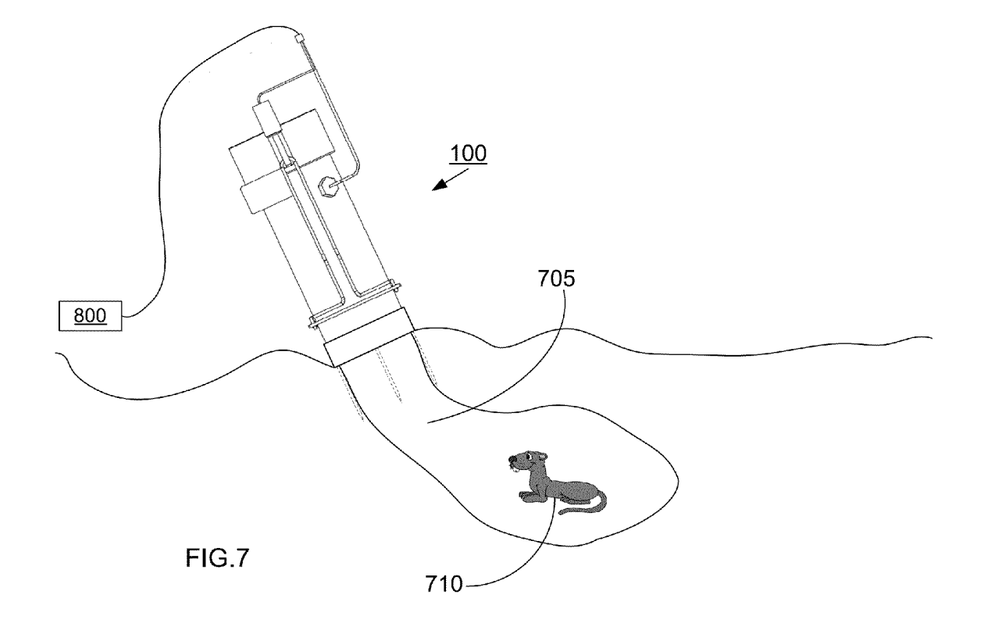
FIG. 7—depicts a side view of an in situ animal trap in accordance with an exemplary embodiment.

Referring to FIG. 6, a perspective view of an animal trap 100 in accordance with an exemplary embodiment is depicted. In this exemplary embodiment, the distal closed end 40 of the animal trap 100 is formed from an end cap 605 dimensioned to fit the distal end of the elongated conduit 5. When standard sized PVC pipe is used as the elongated conduit 5, the end cap 605 is typically constructed from PVC and dimensioned to fit the PVC pipe size of the elongated conduit 5. As previously discussed, a window 55 (not shown in end cap 605) may be included in the distal closed end 40 of the animal trap 100. In another embodiment, an optional trap-to-ground interface collar 615 is provided. The trap-to-ground interface collar 615 may include a plurality of spikes 610 which longitudinally project outward from the collar proximal end 35 of the elongated conduit 5 and the trap-to-ground interface collar 615. The trap-to-ground interface collar 615 may be used for maintaining the animal trap 100 at approximately the same angle of a burrow 705 (FIG. 7) in which an animal 710 (FIG. 7) is present as is shown in FIG. 7. In practice, the spikes 610 are preferably embedded into the soil surrounding the burrow 705 and are not visible to the animal 710.

By experimentation, the inventor of the instant animal trap 100 has determined that some animals (e.g., gophers) are sensitive to changes in their burrow 705 and will investigate the change at the entrance to its burrow by crawling into the animal trap 100 without the need for bait or other attractants. The ability to trap burrowing animals live without the need for bait or other attractants is an unexpected result which simplifies the humane trapping of animals 710.

Referring to FIG. 8, a block diagram of a trigger circuit 800 in accordance with an exemplary embodiment is depicted. Solid lines shown in FIG. 8 are used to denote electrical power supply; dashed lines are used to denote sensor and/or control signals. In an embodiment, the trigger circuit 800 is comprised of a detection circuit 805, a capacitive storage unit 810 and a storage battery 815. The trigger circuit 800 is connected to the sensor 25 and actuator 30, typically using an electrical plug arrangement 70. The ability to separate the electrical components from the elongated conduit 5 allows for cleaning of the mechanical components (elongated conduit 5, linkage 45, door 10 and/or tension member 15) without potentially damaging the electrical components. In an embodiment, the trigger circuit 800 may be housed in a small weatherproof container and coupled to the elongated conduit 5 in a location which does not interfere with operation of the mechanical components.

Signals output from the sensor 25 are monitored by the detector circuit 805 and when a signal representing an animal within the interior volume 60 of the elongated conduit 5 is determined by the detector circuit 805, the detector circuit 805 causes the capacitive storage unit 210 to discharge to the actuator 30. The detector circuit 805 may include sensitivity adjustment circuits and/or sensor signal averaging circuits to discriminate against false alarms caused by a variety of factors including changes in ambient lighting conditions or unintended animals which may venture into the animal trap 100. Alternately, repetitive alarms triggered by the animal's movement within the interior volume 60 may be used to determine whether an actual capture has been accomplished versus a false alarm.

Examples of various sensors and detection circuits are described in US patent publication 2005/0097808, filed Sep. 13, 2004 to Vorhies, et al. (U.S. patent application Ser. No. 10/940,864); U.S. patent application Ser. No. 10/940,864 is hereby incorporated by reference in its entirety as if fully set forth herein.

The capacitive storage unit 810 stores an electrical charge sufficient to energize the actuator 30 which minimizes electrical current drain on the storage battery 815. A charging circuit may be included in the capacitive storage unit 810 which allows capacitor(s) associated with the capacitive storage unit 810 to maintain a charge for extended periods of time by slowing drawing electrical current from the storage battery 815. The storage battery 815 primarily provides electrical power to the detection circuit 805 and sensor 25. In an embodiment, the capacitor(s) associated with the capacitive storage unit 810 storage a charge in a range of 0.01-1 farads. Control of the discharge of electrical energy from the capacitive storage unit 810 may be accomplished by a solid state switching device or electromechanical relay coupled to the detector circuit 805.

The use of solid state electronic components may be preferred over electromechanical relays to reduce electrical power drain of the storage battery 815. In an embodiment, a solar cell 220 may be connected with the storage battery 815. In this embodiment, the battery may be of a rechargeable type, for example, nickel-cadmium (NiCad), nickel-metal hydride (NiMH), lithium ion or any other rechargeable battery types known in the relevant art. In an embodiment, the storage battery 815 is a standard nine volt battery. The solar cell 820 may also be used to directly charge the capacitors associated with the capacitive storage unit 810. A battery charging circuit may be included with the trigger circuit 800 to prevent overcharging of the storage battery 815 by the solar cell 820. The solar cell 820 may be incorporated into the housing containing the detection circuit 805 and capacitive storage unit 810 or provided as a separate attachment.

In an embodiment, a wireless alarm circuit 825 may be included with the trigger circuit 800. The wireless alarm circuit 825 is controlled by the detection circuit 805 and when a signal of an animal is determined by the detector circuit 805, the detector circuit 805 causes the wireless alarm circuit 825 to send an encoded radio frequency signal to a receiving device. The receiving device may be a radio, a light and/or an annunciator. The receiving device may be remotely located so as to alert a user that the animal trap 100 has been tripped without having to locally observe whether the flag 50 attached to the linkage has been raised.

Figure 9:
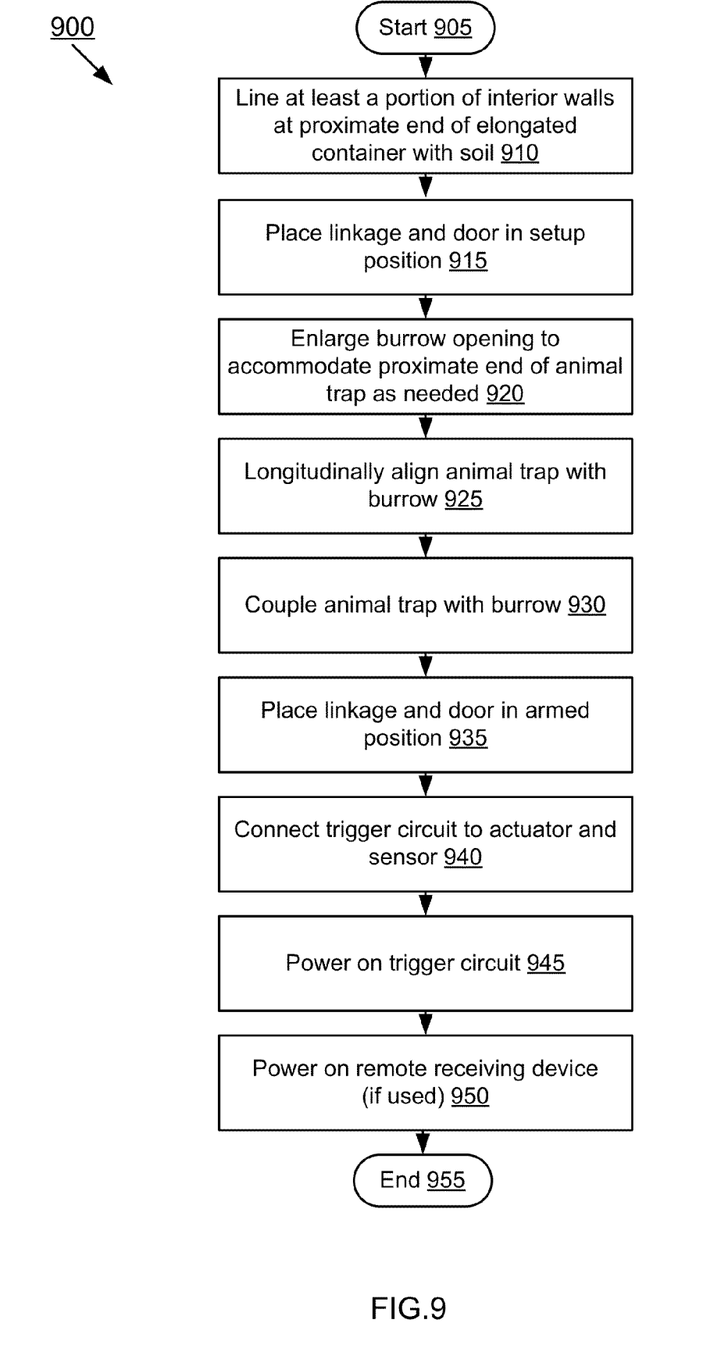
FIG. 9—depicts a preparation flow chart in accordance with an exemplary embodiment.

Referring to FIG. 9, a preparation flow chart 900 in accordance with an exemplary embodiment is depicted. To use the animal trap 100 described herein, the following preparation steps may be instituted. In an embodiment, preparation of the animal trap starts 905 by obtaining soil from around the entrance of the burrow 705 (FIG. 7) and at least lining the inner wall 5b (FIG. 3A) at the proximate end 35 of the elongated conduit 5 with the obtained soil 910. The soil may be moistened to assist in conforming to the inner wall 5b of the elongated conduit 5. The soil should at least longitudinally extend beyond the slot 20 which receives the door 10. The addition of soil to the inner wall 5b of the elongated conduit 5 assists in hiding human scents and provides a surface familiar to the animal as it enters into the interior volume of the animal trap. In embodiments where PVC pipe is used as the elongated conduit 5, the added soil should form a circumferential ring longitudinally extending from the open end 35 (FIG. 2) to at least beyond the slot 20 which receives the door 10. The bias force generated by the tension member 15 will displace the soil covering the slot when the animal trap 100 is tripped.

Formation of the soil ring or coating may be simplified by using a smaller diameter elongated object to compress the soil against the inner wall 5b (FIG. 3A) of the elongated conduit 5. The entrained soil may be anywhere from 0.125-0.25 inches in thickness. Once the soil ring has been formed within the elongated conduit 5, the linkage 45 and door 10 are placed in a setup position 915. The setup position retains the door 10 in an open position and limits movement of the linkage 45 by engagement with the notch 30b (FIG. 2). The notch 30b reduces sensitivity of the linkage 45 during handling of the animal trap 100. Where necessary, the entrance to the burrow 705 may be enlarged 920 to accommodate the proximate end 35 of the elongated conduit 5. Once sufficient soil has been added to the elongated conduit 5, the proximate end 35 of the elongated conduit is then longitudinally aligned with the angle of the burrow 925. The proximate end 35 of the elongated conduit 5 is then coupled with the entrance of the burrow 930 and arranged so as to not interfere with the operation of the door 10 and/or linkage 45. Coupling the animal trap 100 to the burrow 705 may be accomplished by inserting the proximate end 35 of the elongated conduit 5 into the burrow 705. Alternately, the trap-to-ground interface collar 615 (FIG. 6) may be used to align and couple the animal trap 100 with the burrow 705 without having to insert the proximate end 35 of the elongated conduit 5 into the burrow 705.

Generally, after coupling the proximate end 35 of the elongated conduit 5 with the entrance to the burrow 705, the linkage 45 and door 10 are placed in the armed position 935.

In an embodiment, this may be accomplished by sliding the retractable rod 30a (FIG. 1) toward the distal end of elongated conduit 5 such that the linkage 45 is longitudinally displaced from the notch 30b and restively retained near an end of the retractable rod 30a at a position most proximate to the door 10. The armed position aligns the door 10 with the slot 20. The door 10 is held in the armed position by placing the linkage 45 in restive communication with the retractable rod 30a. Generally, the linkage 45 is placed against a surface of the retractable rod 30a which lies between the retractable rod 30a and the elongated conduit 5. The trigger circuit 800 is then connected 940 to the actuator 30 and sensor 25. Once the trigger circuit 800 has been connected to the actuator 30 and sensor 25, the trigger circuit is powered on 945, generally by means of an on/off switch. In embodiments where a remote receiving device is used, the remote receiving device is likewise powered on 950. This completes trap preparation 955.

The various exemplary inventive embodiments described herein are intended to be merely illustrative of the principles underlying the inventive concept. It is therefore contemplated that various modifications of the disclosed embodiments will, without departing from the inventive spirit and scope, be apparent to persons of ordinary skill in the art. They are not intended to limit the various exemplary inventive embodiments to any precise form described. In particular, it is contemplated that the animal trap may be constructed from any suitable material with different dimensions, trapping volumes and/or solid or meshed construction. No specific limitation is intended to a particular construction material, order or sequence described. Other variations and inventive embodiments are possible in light of above teachings, and it is not intended that this Detailed Description limit the inventive scope, but rather by the Claims following herein.

What is claimed:

1. An animal trap comprising:
    an elongated conduit having a proximal open end, a closed distal end, an inner wall, an outer wall, and a slot receiving a door therethrough;
    the door dimensioned to substantially encompass a cross sectional area of the inner wall of the elongated conduit when urged into the slot;
    a tension member coupled to the door for urging the door into the slot independent of gravity or geometric alignment of the animal trap; the tension member having a incurvate shape which conforms to the outer wall of the elongated conduit;
    an actuator having an electrically retractable rod in slidable communication with a linkage; the retractable rod having a normally extended position and a electrically retracted position;
    the linkage dimensioned to longitudinally couple the retractable rod with the door when in the normally extended position such that the linkage maintains the door in an armed position proximate to the slot;
    a sensor for signaling a presence of an animal within an interior volume of the elongated conduit;
    a trigger circuit operatively coupled with the sensor and the actuator for causing the retractable rod to reposition from the normally extended position to the electrically retracted position upon receipt of an animal presence signal from the sensor;
    wherein the electrically retracted position releases the linkage from the retractable rod allowing the tension member to pull the door into the slot thereby trapping the animal within the interior volume;
    wherein the linkage comprises:
        a generally L-shaped member having a long leg and a short leg;
        the long leg of the L-shaped member dimensioned to at least span between the retractable rod and the door when the retractable rod is in the normally extended position;
        the short leg of the L-shaped member dimensioned to at least span between the outer wall of the elongated conduit and a substantial long dimension of the door;
        wherein the long leg of the L-shaped member is disposed in general longitudinal alignment with the elongated conduit when the linkage maintains the door in the armed position and in general perpendicular alignment with the elongated conduit when the linkage is released from the retractable rod.

2. The animal trap of claim 1 wherein the sensor is an infrared motion sensor.

3. The animal trap of claim 1 wherein the short leg of the L-shaped member maintains the door within the slot intermediate the inner and outer walls of the elongated conduit when the linkage maintains the door in the armed position.

4. The animal trap of claim 1 wherein the long leg of the L-shaped member includes a flag coupled thereto for visually indicating that the animal trap has been tripped.

5. The animal trap of claim 1 wherein the short leg of the L-shaped member is pivotally coupled with the door.

6. The animal trap of claim 1 wherein the trigger circuit comprises:
    a detection circuit for determining the presence of an animal within the interior volume of the elongated conduit;
    a capacitive storage unit for providing electrical energy to the actuator when the presence of an animal within the interior volume of the elongated conduit is determined by the detection circuit.

7. The animal trap of claim 6 wherein the trigger circuit further comprises:
    a solar cell at least in electrical communication with the capacitive storage unit.

8. The animal trap of claim 6 wherein the trigger circuit further comprises:
    a wireless alert circuit for remotely signaling an alarm unit that the animal trap has been tripped.

9. The animal trap of claim 6 wherein the interior volume of the elongated conduit is substantially devoid of mechanical components.

10. The animal trap of claim 1 wherein the closed distal end includes a window positioned to allow light into the interior volume of the elongated conduit.

11. The animal trap of claim 1 wherein the tension member is disposed in a location along an outer wall of the elongated conduit opposite the slot.

12. The animal trap of claim 11 wherein the tension member generates a bias force directed inward toward the inner wall of the elongated conduit opposite the slot.

13. The animal trap of claim 1 wherein the tension member is selected from the group consisting of a spring, an elastomeric tube, an elastomeric band and a bungee cord.

14. The animal trap of claim 1 wherein the elongated conduit has a circular cross section dimensioned to approximate a cross sectional dimension of a burrow.

15. The animal trap of claim 1 wherein the sensor is disposed in a through wall aperture in the elongated conduit intermediate the slot and the closed distal end.

* * * * *